United States Patent [19]
Tucker

[11] 3,920,197
[45] Nov. 18, 1975

[54] FILM CARTRIDGE
[75] Inventor: Archie J. Tucker, Rochester, N.Y.
[73] Assignee: Eastman Kodak Company, Rochester, N.Y.
[22] Filed: Apr. 30, 1974
[21] Appl. No.: 465,453

[52] U.S. Cl. ............................ 242/194; 352/72
[51] Int. Cl.² .................... G03B 1/04; G11B 15/32
[58] Field of Search.. 242/71.2, 84.8, 195, 197–199, 242/71.7, 194; 352/72, 78 R, 78 C; 206/455

[56] References Cited
UNITED STATES PATENTS
| | | | |
|---|---|---|---|
| 2,951,654 | 9/1960 | Steelman | 242/55.19 A |
| 3,208,686 | 9/1965 | Edwards et al. | 242/194 |

*Primary Examiner*—Leonard D. Christian
*Attorney, Agent, or Firm*—G. H. Childress

[57] ABSTRACT

A film cartridge loaded with a roll of motion picture film having a magnetic stripe on one surface of the film is subject to shaking or impacts during handling of the cartridge which results in displacement of some convolutions of the film in a direction parallel to the axis of the film roll, especially when the film has first clocksprung in a radial direction. When this occurs, friction between the displaced convolution and the adjacent convolutions of the film effectively prevents return of the stepped convolution to its original position. Subsequently, when film is to be pulled from the supply roll during operation of a camera in which the cartridge is positioned, the stepped convolutions can contact a wall of the cartridge defining the supply chamber in the cartridge and produce a frictional force that opposes normal unwinding of the film. This can result in improperly exposed film. In order to avoid the undesirable results from stepped film, the film supply chamber is expanded in a direction parallel to the axis of the roll when the cartridge is inserted into the camera and the cartridge chamber cover or door is closed. This expansion is effected by a member that is pivoted against a wall of the supply chamber by an actuator which may be located on a camera door.

3 Claims, 6 Drawing Figures

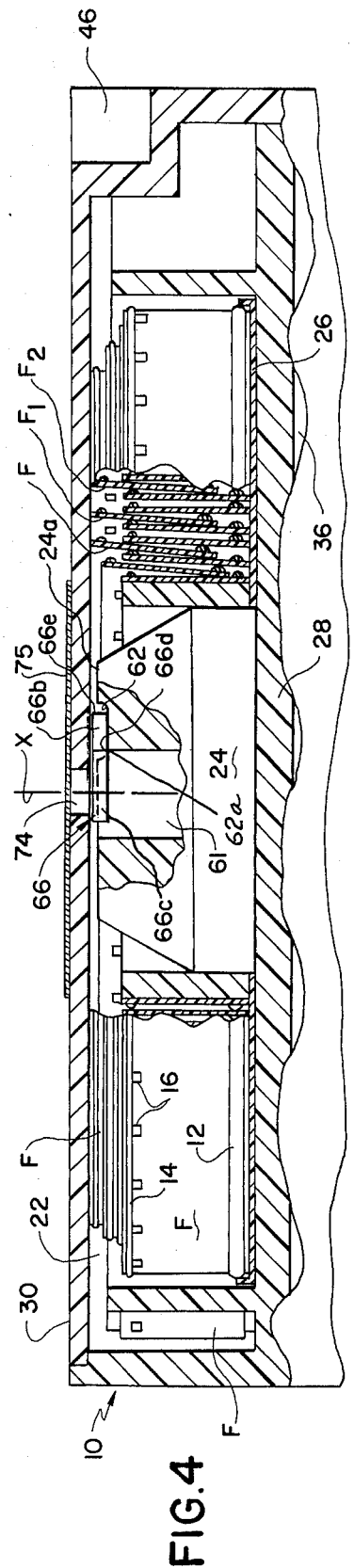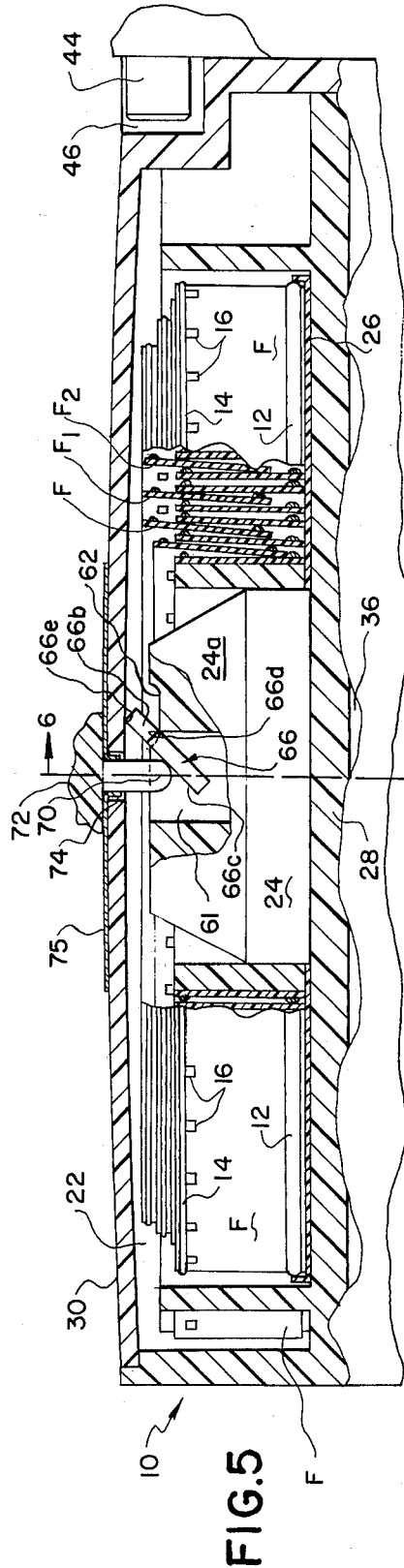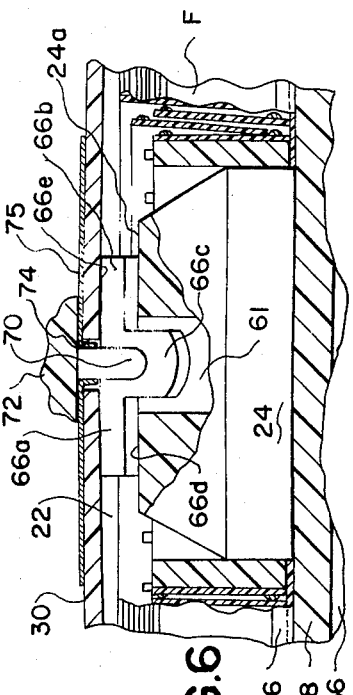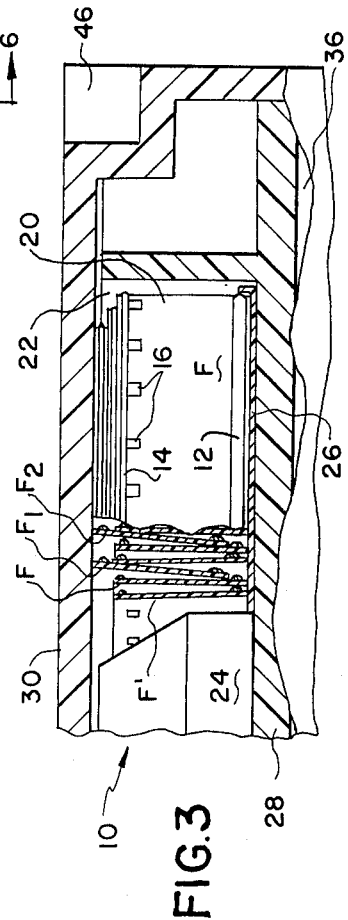

FILM CARTRIDGE

CROSS-REFERENCE TO RELATED APPLICATION

Reference is made to commonly assigned co-pending U.S. Pat. application Ser. No. 336,142, now U.S. Pat. No. 3,858,968 entitled FILM CARTRIDGE, filed in the names of Stephen H. Miller, Robert C. Sutliff, Archie J. Tucker, Neil S. White and Bruce L. Elle, on Feb. 26, 1973.

BACKGROUND OF THE INVENTION

1. Field of the Invention

This invention relates to film cartridges of the type used in motion picture cameras and the like and, more particularly, to such a film cartridge adapted to receive a roll of motion picture film having a sound stripe on one surface of the film which projects from such surface.

2. Description of the Prior Art

Commonly assigned U.S. Pat. No. 3,208,686 entitled Film Cartridge, issued Sept. 28, 1965 in the name of E. A. Edwards et al, discloses a "super 8" film cartridge for motion picture cameras or the like wherein a coreless roll of motion picture film is positioned around (but not attached to) a stationary post in a supply chamber of the cartridge and is withdrawn from the chamber along a film path past an exposure aperture and is then wound onto a takeup core in a takeup chamber of the cartridge, the supply and takeup chambers being in substantially parallel planes and being coaxially disposed with respect to each other. As is well known in the art, the film supply roll in such a cartridge is coreless and therefore is subject to clockspringing, i.e., successive convolutions of the film roll may be displaced radially outwardly relative to the central axis of the roll due to the tendency of a coiled, unsecured film supply roll to unwind. It also is known to modify such cartridges to provide for recording of sound onto the film in the cartridge simultaneous with exposure of the various film frames to scene light. In this regard, reference is made to U.S. Pat. No. 3,442,580 issued May 6, 1969 in the name of A. Winkler. When such cartridges are loaded with film containing a magnetic stripe for recording of sound, the magnetic stripe typically is placed along one side edge of one surface of the film and adjacent the central area of the film where photographic emulsion on the other surface is exposed to scene light. A balance stripe is typically provided on the other side edge of the one surface of the film beside perforations in the film. Both the recording stripe and the balance stripe project from the surface of the film. Because the walls defining these supply chambers in the cartridge are spaced apart by a distance somewhat greater than the width of the film roll to minimize frictional contact therebetween, the various film convolutions can sidestep in a random manner by a distance which allows a sidestepped convolution to overlap one of the stripes (e.g., the sound stripe) and contact one wall of the supply chamber. This problem is especially pronounced when the film has clocksprung as a result of handling during packaging, shipping, etc. As noted before, this results in excessive frictional contact by the supply roll of film and at least one wall of the film supply chamber, and may result in unsatisfactory exposure of film in a camera. Attempts to force the stepped convolutions to return to their original position by surface formations on the walls of the cartridge chamber generally are not satisfactory due to the frictional contact between the stepped convolutions of the film and the adjacent convolutions.

Commonly assigned copending patent application Ser. No. 336,142 entitled "Film Cartridge," filed Feb. 26, 1973 now U.S. Pat. No. 3,858,968, in the name of R. C. Sutliff et al, discloses a cartridge construction which avoids the undesirable results from stepped film. Such application describes a film cartridge having a slidable member with one end portion thereof positioned in a locating notch where it is engageable by a locating pin on one wall of a cartridge chamber of a camera when the cartridge is inserted into the camera. When thus engaged, another end portion of the slidable member moves over a cam surface on a stationary supply post and is forced against a wall of the supply chamber, thereby to expand the film supply chamber in a direction parallel to the axis of the roll. Such application also discloses use of the slidable member for securing the innermost convolution of film against rotation until the cartridge is positioned in a camera so that clockspringing, and thus stepping of the film is avoided.

SUMMARY OF THE INVENTION

It is an object of the present invention to provide a film cartridge which overcomes the difficulties encountered as a result of stepping of film in a supply roll of film in a cartridge.

Another object of the invention is to provide a film cartridge for motion picture film or the like having a sound stripe thereon wherein the film can be properly advanced through the cartridge and correctly exposed even though the supply roll of film in the cartridge has become clocksprung and/or stepped.

A still further object of the invention is to provide a film cartridge for motion picture film or the like having a sound stripe thereon with the film in the supply roll being subject to stepping, wherein the frictional forces between stepped convolutions of film and walls of the supply chamber in the cartridge can be reduced in response to loading of the cartridge into the camera and closing of a cover or door on a cartridge chamber in the camera thereby improving the operation of the cartridge in the camera.

In accordance with the present invention, a film cartridge is provided having walls defining a supply chamber for a roll of film or the like having a tendency to become stepped in an axial direction. One of the walls defining the chamber is flexible. The cartridge has a supply post located in the chamber, and a surface of the post is adjacent the flexible wall. A member is positioned in the cartridge between the surface of the supply post and the flexible wall, the member being mounted for pivotal movement between a first position and a second position and being effective when moved from its first position to its second position to flex such one wall outwardly thereby to expand the chamber. In a preferred embodiment of the invention the cartridge has an opening in the flexible wall for receiving an actuator for moving said member from its first to its second position, and the pivotal member has a lever arm portion between the opening and the supply post when the member is in its first position so that the lever arm portion is engageable by the actuator to effect movement of the member to its second position.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is an enlarged fragmentary view of a portion of the supply side of a film cartridge showing certain convolutions of film stepped in a manner which is considered undesirable;

FIG. 4 is a fragmentary cross section view of the cartridge shown in FIG. 1;

FIG. 5 is a view similar to FIG. 4 but illustrating the cartridge after its insertion into a camera and closing of the cartridge chamber cover or door; and FIG. 6 is a cross section view taken along line 6-6 in FIG. 5.

DESCRIPTION OF THE PREFERRED EMBODIMENTS

Because photographic apparatus is well known, the present description will be directed in particular to elements forming part of, or cooperating more directly with, the present invention, apparatus not specifically shown or described herein being understood to be selectable from those known in the art.

Figure 2:
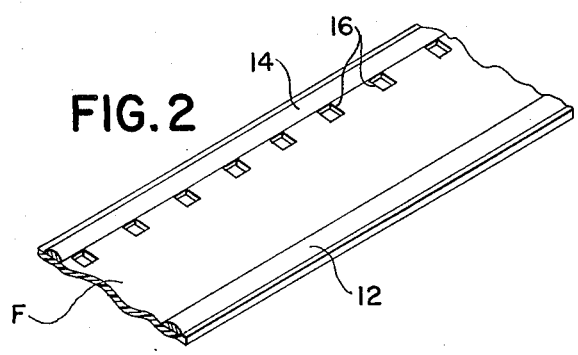
FIG. 2 is an enlarged perspective view of a portion of a film strip of the type loaded in the cartridge shown in FIG. 1.

Referring now to the drawings in detail, a film cartridge according to the present invention is generally designated 10 and is adapted to be loaded with film F. As best shown in the FIGS. 2 and 3, the film F may be a film strip having a stripe 12 of magnetic recording material along one side edge of one surface of the film and a balance stripe 14 along the other side edge of the same surface of the film. The balance stripe is located adjacent to a plurality of perforations 16 in the film strip, and the light sensitive emulsion on the film typically is located on the opposite (lower) surface of the film.

As noted earlier, sound film of the type shown in FIG. 2, when loaded in a super 8 film cartridge as disclosed in the beforementioned Edwards et al patent, tends to clockspring, and this allows the convolutions of the film to sidestep randomly. In part, the clockspringing of the supply roll of film in the cartridge, and thus the resulting stepping of the various convolutions, occurs because the film in the supply chamber of the Edwards et al cartridge is a "coreless" roll of film, i.e., it is not attached to a reel, core or the like and therefore the inner convolution of film is not held stationary. FIG. 3 illustrates the stepping condition that can result from loading of film of the type shown in FIG. 2 in a cartridge as disclosed in the Edwards et al patent. Thus FIG. 3 illustrates a coreless roll 20 of film F located in a supply chamber 22 of the film cartridge. The inner end F' of the film is unattached and loosely positioned around a stationary supply post 24. The film convolutions designated F1 and F2 have become stepped and the lower portions thereof frictionally contact the sound stripe 12 of the film convolutions radially inwardly of the convolutions F1 and F2. The film roll 20 rests on an anti-friction disc 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Because of the anti-friction disc, the film roll can rotate relatively freely with respect to the bottom or inner wall 28 of the supply chamber in the cartridge. However, the stepped convolutions of film F1 and F2 contact the inner surface of the upper wall or cover 30 of the supply chamber and produce a friction force when the supply roll is rotated (as is necessary during advancement of film in a camera). This force increases the load required for proper advancement of film and, as noted earlier, can result in improper exposure of film.

To the extent the cartridge 10 incorporates the same or similar structures as described in connection with FIG. 3, the same reference numerals have been used to designate the same parts of the cartridge 10. Referring now to FIGS. 1 and 4-6, the sound cartridge 10 illustrated in the drawings includes a sound aperture 32 which opens to the bottom and backside of the cartridge (as viewed in FIG. 1) and is adapted to receive certain elements of sound apparatus in a camera. Film in supply chamber 22 is unwound in a counterclockwise direction and threaded past an exposure aperture 34 in the cartridge, through the sound aperture 32 in the cartridge and into a takepu chamber 36 located below wall 28 in a plane parallel to the plane of the supply chamber. As is well known in the art, film in the takeup chamber can be wound onto a core (not shown) that is substantially coaxial with the supply roll and post 24 in the supply chamber. Takeup chamber 36 and the core therein are disclosed in more detail in the beforementioned Edwards et al patent. The takeup core can be made rotatable in the takeup direction only in a manner well known in the art, or the takeup core can be rotatable in the takeup direction only when the cartridge is outside of the camera and then rotatable in either direction after the cartridge is located in the camera, such as disclosed in the copending, commonly assigned U.S. Pat. application Ser. No. 323,019, filed Jan. 12, 1973 in the name of Archie J. Tucker and entitled Disengageable Anti-Backup Device For Film Cartridge.

Figure 1:
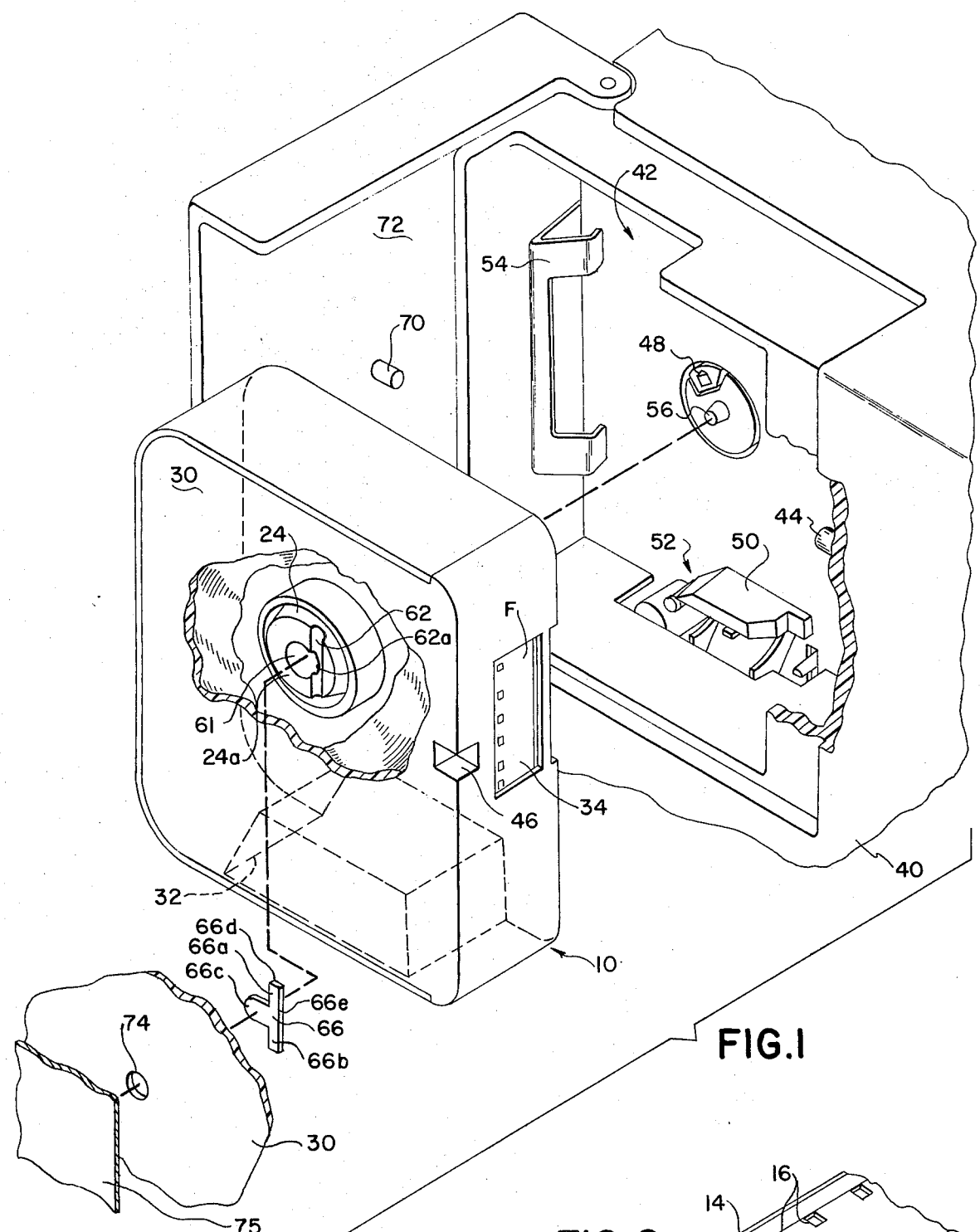
FIG. 1 is an exploded view, partially broken away, illustrating a cartridge constructed in accordance with the present invention and a portion of a motion picture camera or the like adapted to receive the cartridge.

The cartridge 10 is adapted to be positioned in a motion picture camera or the like, a portion of which is generally designated 40 in FIG. 1. Camera 40 comprises a cartridge chamber or compartment 42 having a locating pin 44 on one wall of the chamber which is adapted to be received by a locating notch 46 in the cartridge for locating the cartridge with respect to chamber 42. A drive member 48 projects through the back wall of the cartridge chamber and is engageable with the takeup core of the cartridge. The member 48 is rotated by a friction drive for rotating the core in a takeup direction during operation of the camera. A shroud 50 and certain elements of sound apparatus generally designated 52 are at least partially received in the sound aperture 32 of the cartridge for recording of sound on the magnetic stripe 12 of the film simultaneous with exposure of film through exposure aperture 34. The cartridge is urged toward the right (toward locating pin 44) by suitable spring means 54 in the cartridge chamber. A pin 56 can be provided for disengaging an anti-backup mechanism of the type disclosed in the beforementioned copending patent application in the name of Archie J. Tucker.

In accordance with the present invention means are provided for expanding the size of the supply chamber 22 in the cartridge by spreading the cover 30 in an upward direction (as viewed in FIGS. 4–6). These means avoid the problems referred to hereinbefore which result from clockspringing and then stepping of the film roll. More specifically, the supply post 24 has a centrally located aperture or recess 61 which is substantially coaxial with axis X of the roll of film F in the supply chamber of the cartridge. Recess 61 opens to the upper surface 24a of the supply post and faces the inner surface of cover 30. A groove 62 in upper surface 24a of the supply post is positioned adjacent to the recess 61 and has a neck portion 62a which communicates with the recess. The groove is elongated and can have rounded sloping side edges as best shown in FIGS. 4 and 5.

A pusher member generally designated 66 is substantially T-shaped as best shown in FIGS. 1 and 6. Member 66 comprises arm portions 66a and 66b and a base or lever arm portion 66c, the latter extending through portion 62a of the groove and into the top of recess 61 so that it is in line with the axis X about which the supply roll rotates. The arm portions of member 66 are received in the groove 62 and may project slightly above the surface of the supply post. Member 66 can be pivoted between an initial or first position shown in FIG. 4 wherein it is in a plane substantially parallel to the inner surface of wall 30 and a second or tilted position shown in FIGS. 5 and 6 wherein it is located in a plane inclined at an acute angle to the inner surface of wall 30. As the member 66 moves between its two positions it pivots about a longitudinal edge 66d located at the bottom surface of the member and along the left edge of the arm portions thereof (as viewed in FIGS. 4 and 5). Also, the pusher member has an edge 66e at the diametrically opposite edge of the arm portions which engages the inner surface of wall 30 to effect flexing of wall 30.

An actuator 70 of generally pin-shaped configuration is secured to and projects from the inner surface of a door or cover 72 that encloses the cartridge chamber 42 of the camera. The actuator is located and dimensioned so that when the door is swung to its closed position the actuator passes through an opening 74 in cartridge wall 30 and engages the portion 66c of the pusher member to cause it to pivot from its FIG. 4 position to its actuated position illustrated in FIGS. 5 and 6. Thus the wall of the supply chamber in the cartridge is expanded or bowed in response to an operation that necessarily occurs when preparing the camera for filming operation. While the actuator 70 could be a member actuated manually, this automatic operation is preferred since it eliminates a separate operation that would ordinarily be required by the operator of the camera.

In order to minimize the possibility of light leak into the interior of the cartridge through opening 74 in door 72, a sealing strip such as a lable 75 constructed of a suitable rupturable, light-tight material is positioned on the exterior surface of cover 30 so as to completely cover opening 74. When the cartridge 10 is properly positioned in the compartment 42 of the camera, and when door 72 is moved toward its closed position, the actuator 70 will rupture label 75 prior to entering opening 74 and engaging the lever arm portion 66c of member 66. Completing the movement of door 72 into its fully closed position will effect pivotal movement of member 66 about edge 66d, thereby forcing edge 66e against cover 30 and expanding the size of the supply chamber.

The invention has been described in detail with particular reference to preferred embodiments thereof, but it will be understood that variations and modifications can be effected within the spirit and scope of the invention.

We claim:

1. In a film cartridge having walls defining a supply chamber for a roll of film or the like having a tendency to become stepped in an axial direction, one of the walls defining the chamber being flexible, and the cartridge having a supply post located in the chamber and with a surface of the post being adjacent the flexible wall, the improvement comprising:
   means defining an opening in the flexible wall of the cartridge for receiving an actuator; and
   a member positioned in the cartridge between the surface of the supply post and said flexible wall, said member being mounted for pivotal movement in response to the entry of the actuator into said opening between a first position and a second position and being effective when moved from its first position to its second position to flex said one wall outwardly and thereby expand the chamber, said member having a lever arm portion which is located between the opening and the supply post when the member is in its first position so that said lever arm portion is engageable by said actuator to effect movement of said member to its second position.

2. In a film cartridge as set forth in claim 1 wherein said supply post has a groove on said surface, and said member is positioned in the groove on said post, said member having an edge pivotable about an axis coincident with said groove during movement of said member from its first position to its second position.

3. In a film cartridge as set forth in claim 1 wherein the improvement further comprises rupturable sealing means for preventing light from passing through the opening in said flexible wall, said means being rupturable by said actuator.

* * * * *